United States Patent

[11] 3,588,558

[72] Inventor  Herman Levin
              Ft. Collins, Colo.
[21] Appl. No. 889,324
[22] Filed     Dec. 30, 1969
[45] Patented  June 28, 1971
[73] Assignee  Bell & Howell Company
               Chicago, Ill.

[54] MAGNETIC CLUTCH PROJECTOR DRIVE SYSTEM
     5 Claims, 5 Drawing Figs.
[52] U.S. Cl. .................................. 310/93,
                                                 352/17
[51] Int. Cl. ................................... H02k 49/02,
                                                 G03b 31/04
[50] Field of Search ........................... 310/94, 95;
                                 352/16, 17; 317/6, 5 (Cursory)

[56]              References Cited
              UNITED STATES PATENTS
2,854,526  9/1958  Morgan ................... 179/100.2
3,024,395  3/1962  Pedersen et al. ........... 318/71
3,092,756  6/1963  Smith ..................... 317/6

Primary Examiner—D. X. Sliney
Attorney—William F. Pinsak

ABSTRACT: Drive system for a synchronized motion picture projector in which a projector drive mechanism is coupled through an electromagnetic clutch to a drive motor, preferably an induction motor. The clutch is controlled through a power transistor controlled through a buffer transistor from a bootstrap transistor integrator to which pulses are applied from a flip-flop responsive to reference pulses reproduced from magnetic tape and to pulses from a reed switch of the projector drive mechanism.

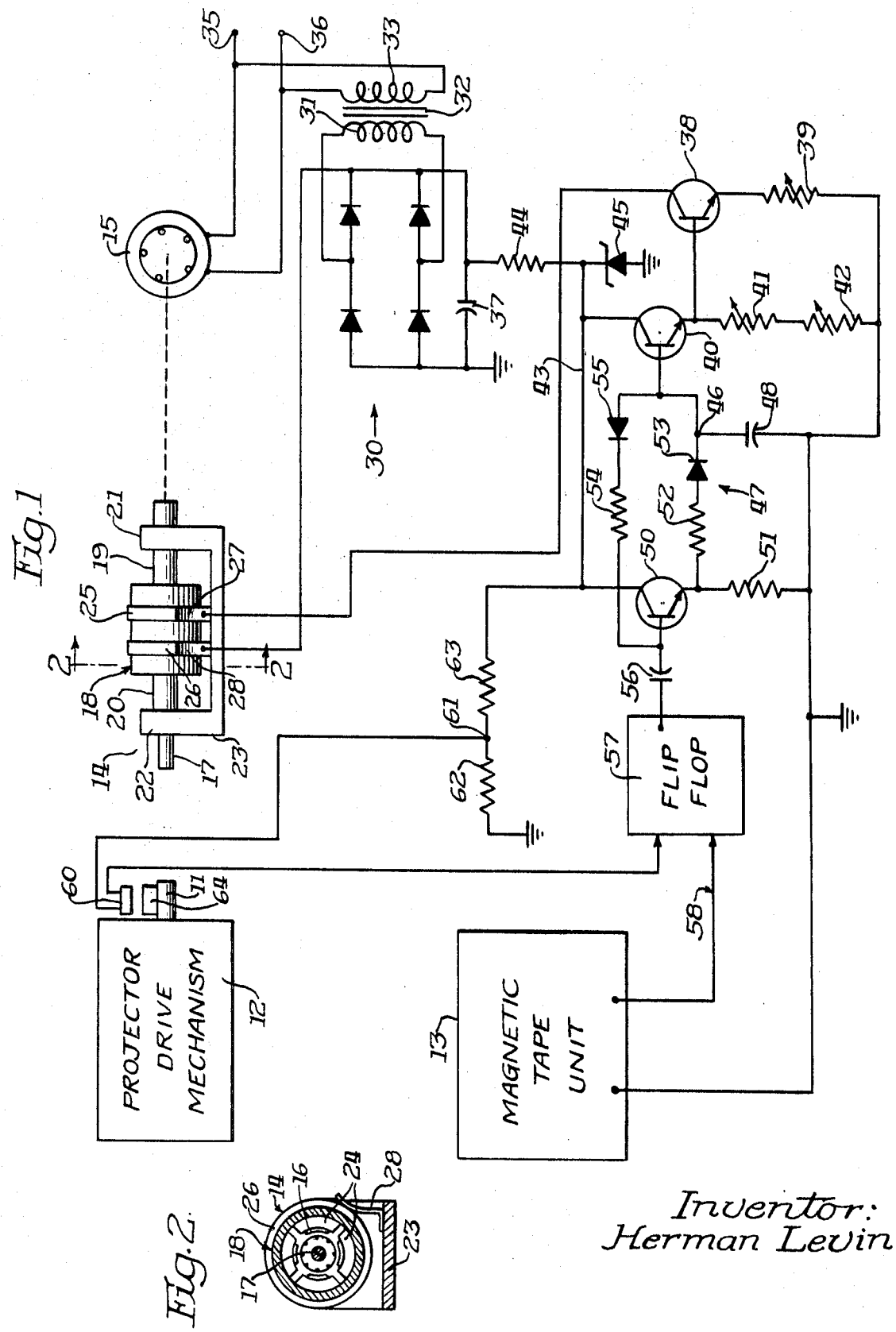

Inventor:
Herman Levin.

MAGNETIC CLUTCH PROJECTOR DRIVE SYSTEM

This invention relates to a drive system for synchronized motion picture projectors and more particularly to a relatively inexpensive but highly accurate, reliable, efficient and smoothly operating system using a magnetic clutch.

Although having other applications, the system of this invention was designed for and is particularly advantageous in synchronized motion picture projector systems in which sound is recorded on magnetic tape during exposure of successive film frames in a camera, the sound being reproduced from the magnetic tape when the film, after developing, is moved through a projector. To avoid the necessity of attempting to move the film and tape at exactly constant relative speed during both recording and reproduction, reference speed signals from the camera are recorded on the magnetic tape and, during reproduction, such signals are used to control the speed of the projector in order to synchronize the projection of the film with the sound reproduction.

Various arrangements have been proposed for controllably driving the projector from the reproduced reference speed signals, including the control of energization of a drive motor, or of a field winding thereof, the control of an eddy current brake mechanically connected to a projector drive motor having a drooping speed-load characteristic, the control of a split pulley or other variable speed drive, and the control of the frequency of an AC voltage applied to a synchronous motor.

The operation of such systems has been generally satisfactory, but they have usually required special motors, relatively high-power electronic regulating circuitry and clutches between the drive motor and the projector mechanism, resulting in high cost and low efficiencies. It has also been difficult to obtain smooth operation, especially during acceleration of the projector mechanism up to operating speed.

This invention was evolved with the general object of overcoming the disadvantages of prior controllable projector drive systems and of providing a controllable drive system which is highly reliable and which is smooth in operation while being relatively simple and inexpensive.

According to this invention, electromagnetic clutch means are provided between the output shaft of electric motor drive means, operated at a substantially constant speed, and an operating shaft of a mechanism to be driven, the electromagnetic clutch means being arranged to transmit a torque which is continuously variable in accordance with the magnitude of an output signal from comparison means responsive to the difference between a reference signal and a speed signal which corresponds to the speed of rotation of the operating shaft.

With this comparatively simple arrangement, it is possible to obtain highly accurate speed control and very smooth operation during acceleration of the operating shaft up to operating speed and in response to changes in the reference signal, changes in the loading of the operating shaft and other variable. An important advantage is that no separate clutch is required, substantially no torque being transmitted by the electromagnetic clutch means in its deenergized condition.

Power requirements are also minimized, due in part to the fact that relatively low electrical power is required to control the electromagnetic clutch. Also, the mechanical power which must be dissipated by the electromagnetic clutch means needs to be only a relatively small portion of the total power transmitted. By way of example, the output shaft of the electric motor drive means may be operated at a speed such that it would drive a motion picture projector mechanism at 22 frames per second if directly coupled to the operating shaft of the projector mechanism. With the operating shaft operated at a speed corresponding to 18 frames per second, the mechanical power lost in the electromagnetic clutch means is only about 22 percent of the power applied to the projector mechanism.

Another important feature of the invention relates to the fact that the operating shaft can be smoothly accelerated up to operating speed without any jerking operation such as encountered with conventional clutches and without imposing severe requirements on the electrical drive motor. An electrical control arrangement is provided with which the smooth acceleration is obtained and with which the rotational inertial energy of the drive motor is gradually transferred to the operating shaft and associated mechanism. During such acceleration, the rotational speed of the drive motor may drop to some extent, but can be brought back up to normal speed in a manner such as to avoid severe loading requirements on the drive motor.

A further important feature and advantage is that the speed of the drive motor is not controlled and may be substantially constant and with the load requirements being minimized, a relatively low-cost motor may be used. Preferably, an induction motor may be used, which is rugged in construction and highly reliable while being low in cost.

The power requirements imposed on the electronic circuitry are minimized and relatively inexpensive components may be used. To control drive in a motion picture projector, the electromagnetic clutch is coupled through a single power transistor to a DC source, with a control signal being applied to the base of the transistor either directly or through a second transistor in a Darlington arrangement. A speed comparator circuit and an integrating circuit are provided which are comparatively simple and inexpensive and with which highly smooth response can be obtained. The circuits are readily adjusted to obtain optimum operation.

It will be appreciated that although this system has other applications, it is highly advantageous when used in the synchronized drive of a motion picture projector.

This invention contemplates other objects, features and advantages which will become more fully apparent from the following detailed description taken in conjunction with the accompanying drawings which illustrate a preferred embodiment and in which:

FIG. 1 is a schematic diagram of a motion picture projector drive system incorporating a magnetic clutch, according to the invention;

FIG. 2 is a sectional view taken substantially along line II—II of FIG. 1, diagrammatically showing the construction of the magnetic clutch;

Figure 3:
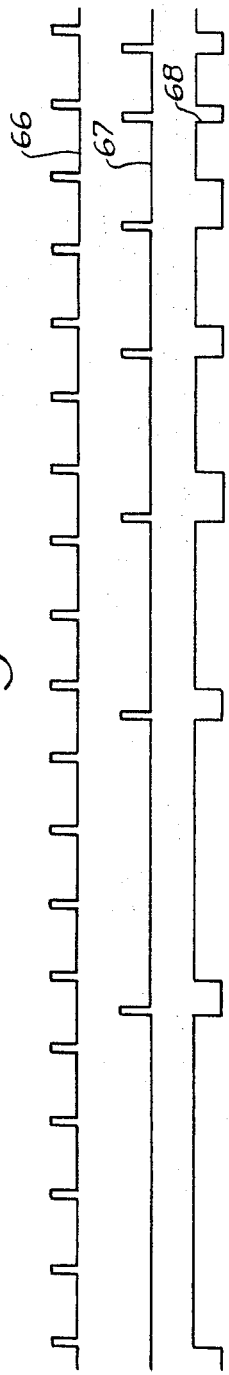
FIG. 3 is a diagram showing wave forms input and output signals of a flip-flop of the system during a starting operation.

Illustrated in FIG. 1 is a motion picture projector drive system constructed in accordance with the principles of this invention. In the system, an operating shaft 11 of a film projector drive mechanism 12 is driven in synchronism with reference speed signals reproduced from magnetic tape by a magnetic tape unit 13, such reference speed signals having been previously recorded on the magnetic tape during exposure of the film in a camera. The unit 13 also reproduces sound previously recorded on the tape during operation of the camera and with the system illustrated, the film projection and sound reproduction are synchronized.

To drive the operating shaft 11 of the projector drive mechanism 12, it is coupled through an electromagnetic clutch 14 to a motor 15 which is preferably an induction motor as diagrammatically shown. As shown in FIG. 2, the electromagnetic clutch 14 may have a construction similar to that of a conventional induction motor, with a squirrel cage rotor 16 affixed on a shaft 17 which is coupled to the projector operating shaft 11. A field structure 18 surrounds the rotor 16 and is carried between coaxial sleeves 19 and 20 in which the shaft 17 is journaled. The sleeves 19 and 20 are journaled in turn, in upstanding portions 21 and 22 of a frame structure 23. Sleeve 19 is coupled to the induction motor 15 so that the field structure 18 is driven while the rotor 16 drives the projector drive mechanism. Windings 24 on poles of the field structure 18, four being illustrated, are connected to sliprings 25 and 26 on the outside of the field structure 18. Rings 25 and 26 are engaged by spring contact members 27 and 28. With direct current applied to the windings, torque is transmitted by the clutch 14 in proportion to the magnitude of the current, and the torque is continuously variable from zero, to a maximum torque which can be transmitted without overloading or overheating. As a result, it is possible to obtain very smooth control of torque. It should be understood that other types of electromagnetic clutches may be used but it is highly desirable that a type of clutch be used which is capable of transmitting a torque which is continuously variable in accordance with the magnitude of current applied thereto.

To supply DC current for operation of the clutch 14, a bridge rectifier 30 is provided having an input connected to the secondary winding 31 of a transformer 32 having a primary winding 33 connected to terminals 35 and 36 which may be connected to a 120-volt, 60-cycle line. The induction motor 15 is also connected to the terminals 35 and 36. A filter capacitor 37 is connected across the output of the bridge rectifier 30 and the negative side is connected to ground while the positive side is connected to the contact 28 of the clutch 14. Contact 27 is connected to the collector of a power transistor 38 the emitter of which is connected through an adjustable resistor 39 to ground. A relatively small control current is applied trough the base-emitter junction of the transistor 38 to control the current therethrough and to thereby control the torque transmitted through the clutch 14. It is noted that a Darlington arrangement may be substituted for the transistor 38, including input and output transistors which may be in a common case, the emitter of the input transistor being connected to the base of the output transistor.

To apply a control current through the transistor 38, the base thereof is connected to the emitter of a buffer transistor 40 and through a fixed resistor 41 and an adjustable resistor 42 to ground. The collector of the transistor 40 is connected to a line 43 which is connected through a resistor 44 to the positive output terminal of the bridge rectifier 30, line 43 being also connected trough a Zener voltage-regulating diode 45 to ground, the voltage of the line 43 being thus regulated. The base of the transistor 40 is connected to a circuit point 46 forming the output terminal of an integrator circuit 47.

Integrator circuit 47 comprises a capacitor 48 connected between circuit point 46 and ground and a transistor 50 having an emitter connected through a resistor 51 to ground and through a resistor 52 and a diode 53 to the circuit point 46. The base of the transistor 50 is connected though a resistor 54 and a diode 55 to the circuit point 46. The base of transistor 50 is also connected through a capacitor 56 to the output of a flip-flop 57 having a "set" input connected through line 58 to the magnetic tape unit 13, reference speed pulses being applied through the line 58 to the flip-flop 57. A "reset" input of the flip-flop 57 is connected through a reed switch 60 to a circuit point 61 connected through a resistor 62 to ground and through a resistor 63 to the line 43. The reed switch 60 may comprise a vane or vanes of magnetic material and is mounted in proximity to the path of rotation of a magnet 64 on the shaft 11 to be operated and to apply a positive pulse to the reset input of the flip-flop 57 during each rotation of the shaft 11. It will be understood that more than one magnet 64 may be mounted on the shaft 11 so that a number of pulses may be applied during each rotation of the shaft 11, if desired.

FIG. 3 shows waveforms 66, 67 and 68 at the set input, reset input and output terminals of the flip-flop 57, during a part of a starting operation. The reference speed pulses applied from the magnetic tape unit 13 through the line 58 to the set input of the flip-flop 57 place the flip-flop in a set condition and a positive signal is developed at the output of the flip-flop which is applied through the integrating circuit 47 and the buffer transistor 40 to the transistor 38 to apply current through the electromagnetic clutch 14 and to transmit torque from the motor 15 to the shaft 11. When the shaft 11 starts to rotate, a pulse is applied from the switch 60 to the flip-flop 57 to reset the flip-flop 57. Within a short time, in the initial part of the operation, the flip-flop 57 is again placed in a set condition by a reference speed pulse from the unit 13, so that current continues to be applied to the electromagnetic clutch 14. As the speed of the shaft 11 is accelerated, and as it approaches the desired operating speed, the percentage of time that the flip-flop 57 is in its set condition decreases with the result that the speed is rapidly accelerated initially, but the acceleration is gradually decreased as the operating speed is approached.

Figure 4:
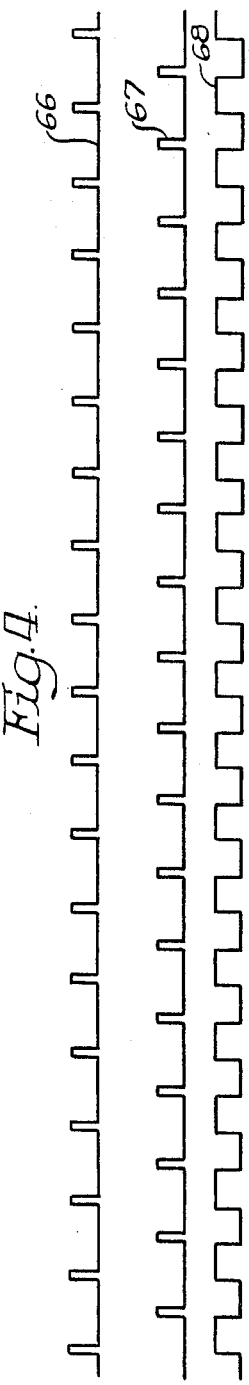
FIG. 4 is similar to FIG. 3 but shows the waveforms during operation at average speed and load conditions.

FIG. 4 shows the same waveforms during operation under stable conditions at a certain average speed. As illustrated, the reed switch 60 may apply pulses at times halfway between the reference speed pulses from the magnetic tape unit 13, with the result that the flip-flop 57 is in its set condition one-half of the time.

Figure 5:
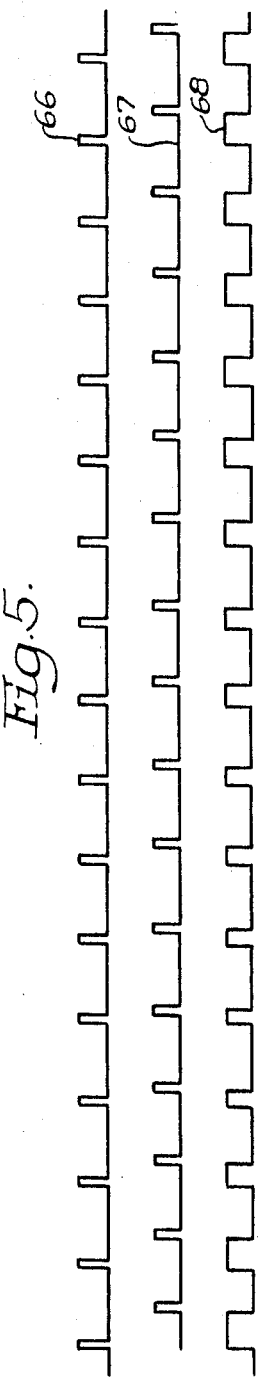
FIG. 5 is similar to FIGS. 3 and 4 and shows the waveforms during operation at less than average speed.

FIG. 5 shows the operation when the rate of the reference speed pulses is reduced. In this case, the time interval between each reference speed pulsed and the operation of the reed switch 60 is reduced so that the flip-flop is in its set condition for less percentage of the time and a smaller current is applied to the electromagnet clutch 14 until the speed of the shaft 11 is reduced to correspond to the rate of the reference pulses, whereupon a stable condition is reached in which the flip-flop 57 is in its set condition for a certain percentage of the time, which may be slightly less than that during the average speed conditions as depicted in FIG. 4.

It should be noted that variations in other conditions, such as the loading of the projector drive mechanism, the supply voltage to the motor 15 and the like produce changes which are automatically compensated for by means of the operation of the circuit. The circuit thus functions to produce rapid and smooth acceleration to the operating speed and also to maintain accurate synchronization of the operation of the projector with the magnetic tape unit.

The integrator circuit 47 has a "bootstrap" operation. An initial pulse applied to the base of transistor 50 results in the charge of the capacitor 48 through transistor 50, resistor 52 and diode 53. As capacitor 48 is charged, a current flows through diode 55 and resistor 54 back to the base-emitter junction of transistor 50 to maintain the charging current. The next pulse increases the charge of capacitor 48 and after several pulses of a certain duration, applied at a certain rate, an equilibrium is established with the capacitor 48 being charged to a voltage proportional to the percentage of time that the flip-flop 57 is in its set condition.

The capacitor 48 has a discharge path through the base-emitter junction of the buffer transistor 40 and through resistors 41 and 42 to ground. The resistor 42 may be adjusted to adjust the rate at which the charge of the capacitor 48 may change to thus control the response time of the circuit.

The resistor 39 adjusts the amount of control voltage required to produce a given torque, applied through the clutch 14. Normally, the resistor 39 may be adjusted so that the flip-flop 57 is in its set condition about half of the time during normal or average conditions of operation. The circuit will then respond to wide variations and conditions to maintain synchronized operation.

It is noted that the reference speed pulses do not have to be developed from magnetic tape but can be developed by a cam-operated switch or by other means. It should also be understood that the system can be used for purposes other than the drive of a motion picture film projector mechanism, although it is particularly advantageous when used in producing synchronized operation of a mechanism in accordance with a reference signal.

It is further noted that to accommodate changes in operating conditions and also to insure operation at the proper speed even with a certain amount of slippage in the clutch unit 14, the motor 15 should be operated at a speed substantially higher than the maximum speed of rotation of the shaft 11. By way of example, and not by way of limitation, the motor 15 may be operated at a speed such that if the clutch 14 provided a direct coupling, the mechanism 12 would be operated at 22 frames per second while the average operating speed may be on the order of 18 frames per second.

It will be understood that modifications and variations may be effected without departing from the spirit and scope of the novel concepts of this invention.

I claim:

1. In a system including an operating shaft to be started from a standstill, pulsed and rotated in accordance with a reference signal, at a speed within a predetermined range, the improvement comprising sensing means arranged to develop a pulsed output signal the frequency of which is proportional to the speed of rotation of the operating shaft, a comparison means including a flip-flop having two stable states responsive to said pulsed reference signal and to said pulsed output speed signal, means for triggering said flip-flop to one state in response to said reference pulses and to its alternate state in response to said output speed signal so as to develop a control signal corresponding to the difference between said reference signal and said output speed signal, electric motor drive means including an output shaft rotated at a substantially constant speed higher than said certain speed range and an electromagnetic clutch means electrically coupled to said comparison means and mechanically coupled between said output shaft and said operating shaft, said electromagnetic clutch means being arranged to transmit a torque which is continuously variable in accordance with the magnitude of said output current applied thereto.

2. In a system as defined in claim 1, said comparison means further comprising an integrator circuit connected to the output of said flip-flop.

3. In a system as defined in claim 2, means for controlling the response time of said integrating circuit.

4. In a system as defined in claim 3, an amplifier responsive to said control signal and coupled between said flip-flop and said electromagnetic clutch, an emitter-follower buffer stage between said integrator circuit and said amplifier and an adjustable resistor in the emitter circuit of said buffer stage constituting said means for controlling the response time of said integrator circuit.

5. In a system as defined in claim 2, said integrator circuit comprising a transistor having a base, emitter and collector electrodes, a capacitor, means coupling said capacitor to said emitter electrode to be charged in accordance with voltages applied to said base electrode, and means coupling said capacitor to said base electrode to continue conduction of said transistor and to obtain a bootstrap operation.